United States Patent [19]

Hayashi et al.

[11] Patent Number: 4,646,174
[45] Date of Patent: Feb. 24, 1987

[54] MAGNETIC TAPE REPRODUCING APPARATUS INCLUDING AUTOMATIC STOP MECHANISM

[75] Inventors: Hideki Hayashi; Satoshi Takagi; Kikuo Yoshikawa, all of Tokyo, Japan

[73] Assignee: Clarion Co., Ltd., Tokyo, Japan

[21] Appl. No.: 527,133

[22] Filed: Aug. 26, 1983

[30] Foreign Application Priority Data

Sep. 1, 1982 [JP] Japan ............................... 57-150650
Sep. 10, 1982 [JP] Japan ............................... 57-156581

[51] Int. Cl.⁴ .................. G11B 15/48; G11B 5/54; B65H 59/38
[52] U.S. Cl. .................. 360/74.2; 360/74.1; 360/105; 242/191; 242/186
[58] Field of Search .......... 360/74.1, 74.2, 74.3, 360/71, 69, 90, 93, 96.1, 137; 242/186, 189, 190, 191

[56] References Cited

U.S. PATENT DOCUMENTS

| | | | |
|---|---|---|---|
| 3,915,408 | 10/1975 | Ishikawa | 242/191 |
| 4,033,491 | 7/1977 | Aldenhoven | 226/11 |
| 4,089,487 | 5/1978 | Ichikawa et al. | 242/186 |
| 4,170,789 | 10/1979 | Inoue | 360/137 |
| 4,269,373 | 5/1981 | Tsuchiya et al. | 242/191 |
| 4,402,020 | 3/1983 | Yokota et al. | 360/72.1 |
| 4,495,532 | 1/1985 | Kurafuzi et al. | 360/71 |

FOREIGN PATENT DOCUMENTS

| | | | |
|---|---|---|---|
| 53-145604 | 12/1978 | Japan | 360/71 |
| 54-128712 | 10/1979 | Japan | 360/137 |
| 57-58256 | 4/1982 | Japan | 360/137 |
| 57-143757 | 6/1982 | Japan | 360/69 |

Primary Examiner—Stuart N. Hecker
Assistant Examiner—Benjamin E. Urcia
Attorney, Agent, or Firm—Flynn, Thiel, Boutell & Tanis

[57] ABSTRACT

A magnetic tape reproducing apparatus includes two reel bases which can engage and drive reels of a cassette, and a detecting arrangement which can detect a stationary condition of a first of the reel bases resulting from the end of a tape having been reached. A mechanism is provided to initiate ejection of the cassette from the apparatus if an end of tape condition is detected during fast-forward or reproduction modes of operation, and to place the apparatus in reproduction mode if an end of tape condition is detected during rewind mode. Further, a mechanism is provided to brake the first reel base when the cassette is being inserted, and a mechanism is provided to override the detecting arrangement during cassette insertion.

4 Claims, 13 Drawing Figures

FIG. 1

PRIOR ART

FIG. 2

PRIOR ART

MAGNETIC TAPE REPRODUCING APPARATUS INCLUDING AUTOMATIC STOP MECHANISM

BACKGROUND OF THE INVENTION

1. Field of the Invention

The present invention generally relates to a magnetic tape recording and reproducing apparatus which is of a so-called one-way type for reproducing only one side of a cassette pack tape, and more particularly to an improved magnetic tape reproducing apparatus which can automatically proceed, when the end of tape is detected, to a subsequent operation such as stopping of the drive motor, ejection of the cassette pack or reproduction of the tape from the beginning.

2. Description of the Prior Art

The magnetic tape recording and reproducing apparatuses include two well-known types: an automatic-return type for automatically reproducing both sides of a cassette pack tape successively, and a one-way type for reproduction of only one side of a cassette pack tape.

When a magnetic tape in a cassette pack being played reaches the end of tape in the case of a one-way type magnetic tape reproducing apparatus, it is necessary to stop the drive motor for putting the apparatus as a whole out of operation, or to eject the cassette pack for reproducing another cassette pack tape. In the case of a magnetic tape recording apparatus in which normally the drive motor is only stopped but no ejection of the cassette pack is done, or in which ejection of the cassette pack is done under the action of a spring or the like, a change of tape tension at the tape end is detected for stopping the drive motor. In the case of a magnetic tape reproducing apparatus of a so-called automatic-ejection type in which the cassette pack is automatically ejected as driven by the drive motor, the stop of reel base rotation is detected by electrical means such as a proximity switch and photocoupler, or by other mechanical means, for thereby switching the driving force of the motor from the reel base side to the ejection mechanism, thus ejecting the cassette pack, and then the motor is stopped.

Heretofore, it has been proposed to utilize the friction between the reel bases and their respective associated rotation detecting discs for mechanically detecting the stopped rotation of the reel bases in order to detect the end of tape as discussed above.

Figure 1:
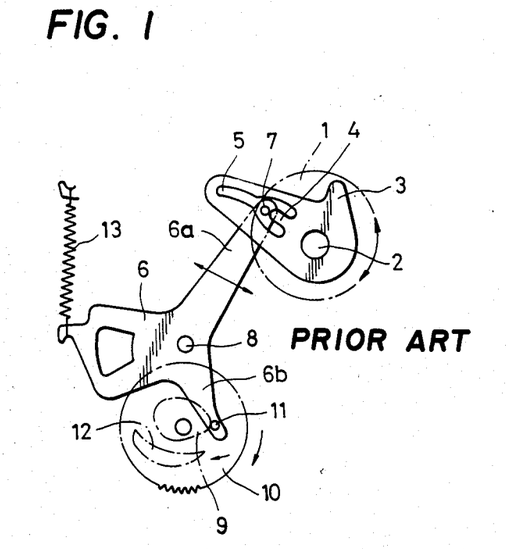

As shown in FIG. 1, such a device for detection of the end of tape comprises a rotation detecting disc or member 3 fitted on the outer circumference of a boss 2, in friction therewith, the boss 2 being formed integrally with a reel base 1, and the disc 3 having a protrusion 4 thereon. The disc 3 has further formed therein a Y-shaped guide slot 5, between two upper segments of which the protrusion 4 is located, and in which there is oscillatably fitted a pin 7 provided at one end 6a of an oscillating plate 6 which is separately supported. The oscillating plate 6 is rotatably supported to a support shaft 8, and also coupled at the other end 6b thereof with a well-known stopping mechanism and tape reverse mechanism (not shown) which are actuated as a result of the detection of the end of tape.

Furthermore, the oscillating plate 6 is oscillated by a cam 9 which is rotated under the effect of the driving force of the motor, in such a manner that the pin 7 is moved reciprocally within the Y-shaped guide slot 5. Particularly, the cam 9 is provided near the center of a pulley 10 normally driven by the motor, and as a cam follower pin 11 provided at the end 6b of the oscillating plate 6 moves along the circumferential surface of the cam 9, the pin 7 moves, as shown in FIG. 1, between the branching point and the end of each branch thereof. Also, the pulley 10 has provided at the outside thereof an island cam 12 which is separate from the cam 9. As shown, in FIG. 2, when the cam follower pin 11 moves over the circumferential face of this island cam 12, the pin 7 moves reciprocally from the base of the Y-shaped guide slot 5 to the branching point thereof (namely, the end of the protrusion 4).

Note that there is provided between the oscillating plate 6 and the chassis of the magnetic tape reproducing apparatus a spring 13 which forces the cam follower pin 11 toward the surfaces of the cam 9 and island cam 12.

Figure 2:
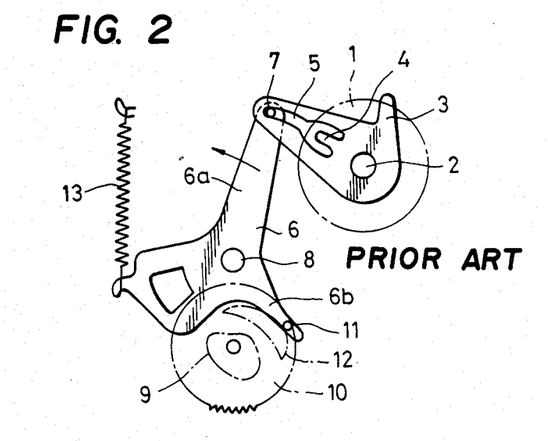

In this prior-art magnetic tape reproducing apparatus, the end of tape is detected in the following manner:

First, while the tape is running, the reel base 1 is rotating as shown in FIG. 2, and the rotation detecting disc 3 which is frictionally engaged with the boss 2 is urged by the reel base 1 in the rotating direction thereof, for example, in the direction of arrow as shown. One of the branches of the Y-shaped guide slot 5 will take the same direction as the orbit delineated by the oscillating plate 6. Therefore, the oscillating plate 6 will be caused, by the cam follower pin 11 being normally-in contact with the rotating cam 9, to repeatedly move over a short distance equivalent to the length of the one branch of the Y-shaped guide slot 5. Since the end of tape is not yet reached while such a small oscillation is being repeated, the stopping and tape reverse mechanisms operationally connected with the oscillating plate 6 are not activated.

On the other hand, when the end of tape is reached and so the reel base 1 stops rotating, the rotating detecting disc 3 is no longer urged in the direction of the arrow. Thus, as the pin 7 attempts to move into a branch of the Y-shaped guide slot 5 under the action of the cam 9, it will abut the protrusion 4 between the branches so as to become incapable of getting into any of the branches of the slot 5. It should be noted that in case the reel base 1 then rotates and the rotation detecting disc 3 is applied with a frictional force, the pin will be able to enter either of the slot branches since even the abutment of the pin 7 on the protrusion 4 causes the disc 6 to immediately escape in the direction of arrow.

As the pulley 10 keeps rotating even after the oscillation of the plate 6 is suspended by the abutment of the pin 7 on the protrusion 4, the cam follower pin 11 will leave the circumferential surface of the cam 9. That is, as the circumferential surface of the cam 9 approaches the center of the pulley 10, the pin 7 of the oscillating plate 6 moves toward the branches of the Y-shaped guide slot 5. However, when the pin 7 gets engaged with the protrusion 4, the cam follower pin 11 cannot follow the cam 9 any longer. As the pulley 10 keeps rotating in such conditions, the cam follower pin 11 will abut the circumferential face of the island cam 12 which in turn will force the oscillating plate 6 to start oscillating in the opposite direction. The island cam 12 will further cause the pin 7 to reciprocally move between the protrusion 4 and the end of the stem or base of the Y-shaped guide slot 5. In this way, the oscillating plate 6 will oscillate a greater stroke as compared with that while the tape is running. This increased oscillation is used to determine the end of tape and thus actuate the motor stopping and cassette ejection mechanisms operationally coupled with the oscillating plate 6.

However, use of such prior-art mechanical tape-end detection device utilizing the friction in the one-way type magnetic tape reproducing apparatus incurs the following various problems:

As well known, in a magnetic tape reproducing apparatus, the tape is made to run in the following three modes: Reproduction or playing mode; fast-forward mode for fast forwarding the tape in the same direction as for tape reproduction; and rewind mode for fast run of the tape in the opposite direction to that for tape reproduction. Among these modes of tape run, the reproduction and fast forward modes make it necessary that when the trailing end of the tape is reached, the cassette or cassette pack should be ejected and the user should turn the cassette from one side to another and insert it back into the magnetic tape reproducing apparatus. In the rewind mode, the cassette need not be turned as in the above, but the tape must be reproduced in the reproduction mode from the beginning end of the tape.

However, in the prior-art magnetic tape reproducing apparatus described with reference to FIG. 1 and FIG. 2, both the trailing end and beginning end of a tape are similarly detected as a tape end, and even in case no ejection of the cassette is necessary, as in the rewind mode, the ejection mechanism will be actuated as in the other modes, namely, in the reproduction and fast-forward modes. Thus, the user has to insert the ejected cassette as it is back into the magnetic tape reproducing apparatus in order to restore the reproduction state. Such operations have been a great nuisance to the users.

Furthermore, the use of a mechanical tape-end detection device utilizing friction, as described and illustrated in the foregoing, in a magnetic tape reproducing apparatus of a so-called automatic-loading type into which a cassette pack is loaded by the driving force of the drive motor, the following problems result:

Loading of a cassette pack into the magnetic tape reproducing apparatus under the effect of the driving force of the drive motor makes it necessary to turn on the power on-off switch and start the motor when the cassette pack has been inserted a little into the cassette insertion opening of the apparatus.

It will take a certain length of time until the cassette pack is pulled in and fully loaded into the apparatus under the action of the motor thus started.

For this reason, when the reproduction head is pressed to the tape and the pinch roller is pressed to the capstan after the cassette pack is loaded into the apparatus in the automatic mode, the tape will already have been made to run by the reel base, to which the revolution of the motor is transmitted at the same time as the powering of the apparatus, with the result that the reproduction will not be started at a correct position of the tape. Especially in case a cassette pack tape is used on which starts of records or selections are preset in respective start positions by indexing, such start of reproduction at an incorrect position results in missing of such record starts.

Generally, a prior-art magnetic tape reproducing apparatus adopts, to avoid the above-mentioned inconvenience, an arrangement in which an idler or the like is used to keep stopping the reel base without transmission of the driving force of the motor thereto until the head and pinch roller are completely pressed to the tape and capstan, respectively. Use of the frictional-type tape end detecting device described with reference to FIG. 1 in a such magnetic tape reproducing apparatus will, however, result in occurrence of a tape end detection since the reel base is not rotated. As the result, the stopping mechanism is actuated to make the head and pinch roller move in the opposite direction to that for run of the tape, the cassette pack is ejected following the acutuation of the stopping mechanism, which however depends on the type of magnetic tape reproducing apparatus used, or the tape run is reversed, resulting in no reproduction of any intended program or record on the tape. Also if the tape is slackened within the cassette tape, it may possibly be wound on the pinch roller or capstan. To avoid this, the take-up reel base should preferably be rotated to unslacken the tape before the latter is pressed to the head and pinch roller. However, in the case of a magnetic tape reproducing apparatus in which an idler is used to isolate the reel base from the driving force of the motor, the tape cannot be unslackened.

SUMMARY OF THE INVENTION

Accordingly, the present invention has as an object to provide a magnetic tape reproducing apparatus with a control system for stopping of the motor or ejection of the cassette pack when an end of tape is reached while the apparatus is being operated in reproduction or fast forward mode, and also for effecting, when a tape end is reached during rewind mode, an immediate restoration of the reproduction mode.

Another object of the present invention exists in providing a magnetic tape reproducing apparatus with a mechanism intended for preventing the tape-end detecting mechanism from detecting a tape end when the reel base is not rotated before the head is pressed to the tape.

The above object of the present invention is attained by a magnetic tape reproducing apparatus comprising, according to the present invention, a pair of reel bases; head shifting means for pressing a reproduction head to a tape within a cassette pack set on the pair of reel bases; switching means which is movable to-and-fro as a result of being operationally connected with the head shifting means; mechanical means operationally connected with the reel bases to detect a tape end; a switch for selection of operation modes of the apparatus, this switch being so arranged as to be turned on and off by the switching means when the latter is actuated by the tape-end detecting means when an end of tape is detected; means which is engaged with the head shifting means when the tape is to be fast-forwarded or rewound for actuating the fast forward or rewind mechanism; and means operationally connected with the tape-end detecting means to reset the fast-forward/rewind mechanism actuating means. The apparatus according to the present invention is constructed as described above, and more particularly, it is provided with, for example, a switching link movable to-and-fro as a result of being operationally connected with the head. In a forward position of this link, an oscillating plate of the tape end detecting device is provided so as to be capable of abutting the link, and it oscillates through a large stroke when a tape end is detected. Also there is provided a switch which is actuated by the link to stop the motor or start the ejection of the cassette pack. Further, a fast-forward/rewind resetting lever is operationally connected with the oscillating plate.

Thus, with the recognition of the fact that the forward position of the head is different in the reproduction mode from in the fast forward and rewind modes, the present invention has been so worked out so that when the head moves toward the tape and the apparatus is in the reproduction mode of operation, the switching link is moved to a position near the motor stopping or ejection starting switch and the switching link is made to pivot under the action of the oscillating plate which has detected a tape end for thereby operating the switch.

On the other hand, when the head is in the position away from the tape and the apparatus is in the fast forward or rewind mode, the switching link is moved back to a position away from the oscillating plate and switch so that the switch will not be operated even under the action of the oscillating plate having detected an end of tape, and the action of the oscillating plate having detected the tape end is utilized to actuate the fast-forward or rewind lever resetting mechanism, thus unlocking the fast-forward/rewind lever.

These and other objects and advantages of the present invention will be better understood from the ensuing description made, by way of example, of the embodiments according to the present invention with reference to the accompanying drawings.

BRIEF DESCRIPTION OF THE DRAWINGS

FIGS. 1 and 2 are plan views together showing an example of a conventional mechanical tape-end detecting device using an oscillating plate, FIG. 1 showing the device in a positon where the tape is running, while FIG. 2 shows the device in a position where the tape comes to an end;

FIGS. 3 to 5 are plan views together showing an embodimetn of a magnetic tape player with a control device according to the present invention, FIG. 3 showing the device in a position where the tape is running in the reproducion mode of operation, FIG. 4 showing the device in a position where the tape comes to an end in the same mode of operation, while FIG. 5 shows the device in a position where the tape comes to an end in the fast forward mode and/or rewind mode.

FIGS. 12 and 13 are plan views showing an embodiment of the erroneous detection preventive mechanism according to the present invention, FIG. 12 showing the mechanism in operation while FIG. 13 shows it out of operation.

DETAILED DESCRIPTION OF THE PREFERRED EMBODIMENTS

Figure 3:
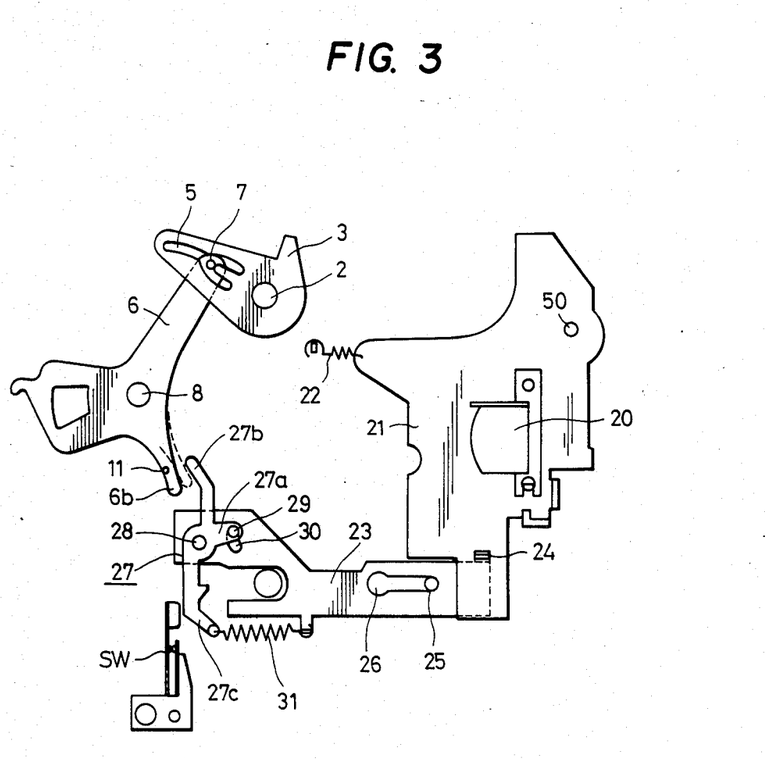

Referring now to FIG. 3 and subsequent Figures, a detailed description of embodiments of the present invention will be made below. Note that like elements or members through all the Figures, including FIGS. 1 and 2, are shown with like reference numerals or symbols, and that further explanation of any part which has appeared once will be excluded hereinafter when it appears after that.

(1)
Construction (a) Switching mechanism

Figure 4:
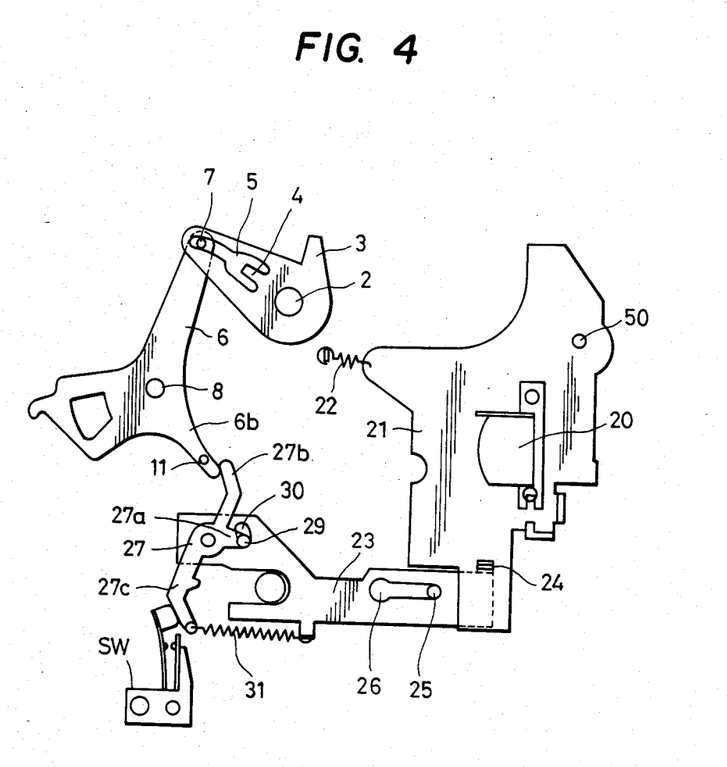
Figure 5:
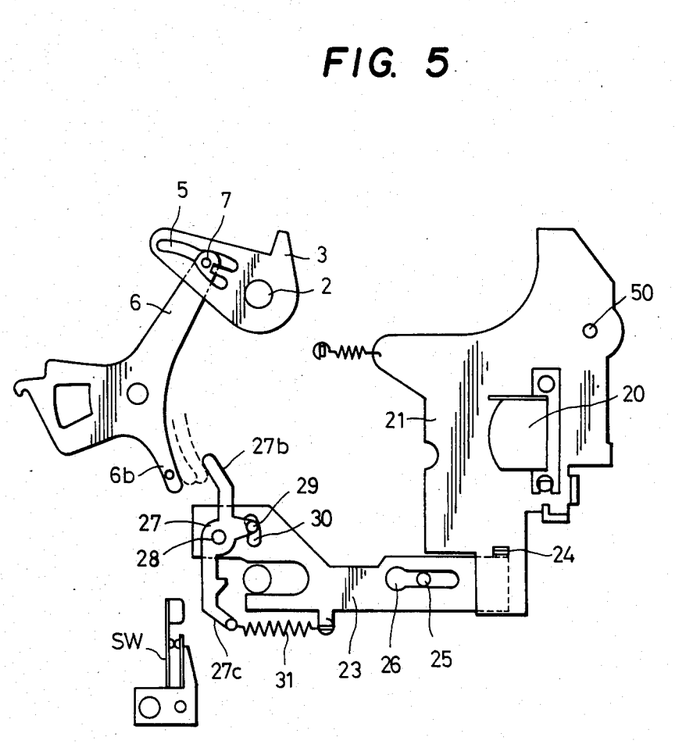

FIGS. 3 to 5 show a switching mechanism adopted in the inventive embodiment.

A head 20 of the inventive magnetic tape reproducing apparatus is secured at the top of a head plate 21 movable to-and-fro (leftwardly and rightwardly in FIG. 3) with respect to the apparatus. The head plate 21 is so arranged as to move forward to a play or forward position where the head 20 is pressed under an appropriate pressure in the reproduction mode to the tape within a cassette pack disposed in the apparatus. On the other hand, when the apparatus is in the fast forward or rewind mode, the head 20 is moved back to a position where it is in light contact with the tape. Further, in the stop mode of the apparatus, the head is moved back to such a stop position further away from that in the fast forward or rewind mode of operation that it will not get in contact with the tape or cassette pack.

According to this embodiment, the head plate 21 is normally forced to the forward position under the action of a spring 22. When the cassette pack is to be ejected, the head plate 21 is moved, against the action of the spring 22, back to the stop position under the effect of the driving force of the motor. As a fast forward or a rewind lever which will be further described later is pushed into the apparatus in order to move the head plate 21 reversely from the position in the reproduction mode so that in the fast forward or rewind mode, a taper cam provided at the end of the lever causes the head plate 21 to move backward against the action of the spring 22.

The head plate 21 has mounted thereon a sliding plate 23 which extends along the moving direction of the head plate 21. That is to say, the sliding plate 23 is engaged by an engagement piece 24 provided at the base thereof with the head plate 21. The sliding plate 23 is so disposed as to be movable to-and-fro as a result of being operationally coupled with the head plate 21. For this movement, a guide pin 25 disposed on the chassis of the apparatus is slidably inserted in a guide slot 26 in the sliding plate 23. The end of this sliding plate 23 is terminated by a yoke which has on one arm thereof a switching link 27 pivotably supported on a support shaft 28.

The switching link 27 has three arms extending in three different directions from the portion pivoted to the support shaft 28. They are the arms 27a, 27b and 27c. Among these arms, the arm 27a extends toward the head plate 21 and is provided at the end thereof with a pin 29 which is inserted in a pivot angle defining hole 30. The second arm 27b is positioned so that it can abut the end of the arm 6b near the pulley 10 of the oscillating plate 6 of the tape-end detecting device. The third arm 27c extends toward a switch SW which is provided on the opposite side of the pin 28 from the oscillating plate 6 and which is used to stop the motor or start ejection of cassette pack. Also, this third arm 27c has provided between the end thereof and the sliding plate 23 a spring 31 for biasing the switching link 27 counterclockwise.

(b) Fast-forward and rewind levers

Figure 6:
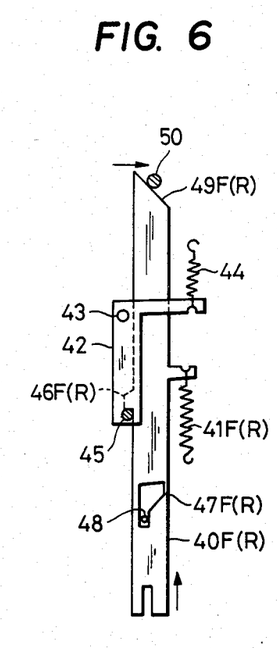
FIG. 6 is a plan view showing the fast-foward-/rewind lever of said embodiment of the present invention being locked.
Figure 7:
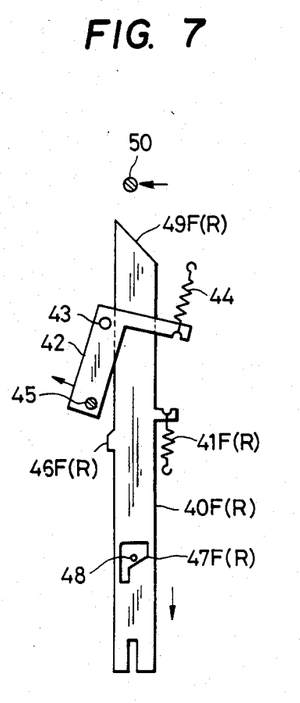
FIG. 7 is a similar plan view showing the lever being reset.

Referring to FIGS. 6 and 7, a fast forward lever 40F and rewind lever 40R, for changing the operation mode of the magnetic tape recording and reproducing apparatus to fast forward and to rewind, respectively, are movably supported, one over the other. Both of these levers 40F and 40R can be pushed from the front escutcheon on the apparatus into the apparatus body. These levers 40F and 40R are normally forced toward the front of the apparatus under the action of respective springs 41F and 41R. Provided above the fast forward lever 40F and rewind lever 40R is a single L-shaped lever locking link 42 which is pivoted at the corner of the L shape to a support shaft 43 and which has a spring 44 provided at the end of one arm 42b thereof extending perpendicular to the fast-forward and rewind levers. The lever locking link 42 is urged by the spring 44 to move in the counterclockwise direction in the plane of the drawing. The lever locking link 42 has provided at the end of the other arm 42b thereof a lock pin 45 projecting downward. When the fast forward lever 40F or rewind lever 40R is pushed in, the lock pin 45 gets into engagement with retaining protrusions 46F and 46R provided on the side faces of the fast forward lever 40F and rewind lever 40R, respectively, for preventing the pushed-in levers 40F and 40R from being returned by the spring 41F and 41R, respectively.

There are provided idler gear changing taper cams 47F and 47R at edges of openings nearly in the respective centers of these levers 40F and 40R. These cams 47F and 40R are tapered symmetrically with respect to a mid line between them, and they each have extending adjacent them a pin 48 of an idler gear changing link.

The levers 40F and 40R have provided at the respective ends thereof taper cams 49F and 40R for effecting a reverse (rightward) shift of the head. These taper cams 49F and 40R are so designed as to slidably get into contact with a shift pin 50, which is fixed on and perpendicular to the top surface of the head plate 21, when the lever 40F or 40R is pushed in.

(c) Fast-forward/rewind lever resetting mechanism

Provided between the oscillating plate 6 of the tape-end detecting device shown in FIGS. 1 and 2 and the fast-forward and rewind levers 40F and 40R shown in FIGS. 6 and 7 is a mechanism intended for releasing one of the levers 40F and 40R previously pushed into the tape recording and reproducing aparatus so as to return the apparatus to the reproduction mode.

Figure 8:
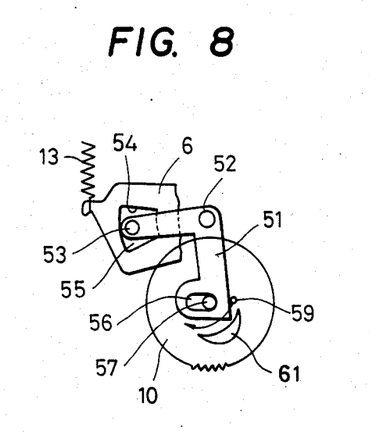
FIG. 8 to 10 are partial views of the unlocking link of said inventive embodiment, FIG. 8 showing the device in a position where the tape is running, FIG. 9 showing the early time of tape ending and FIG. 10 showing the device in a position where the tape comes to an end.
Figure 9:
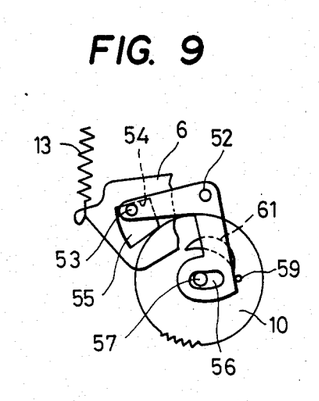
Figure 10:
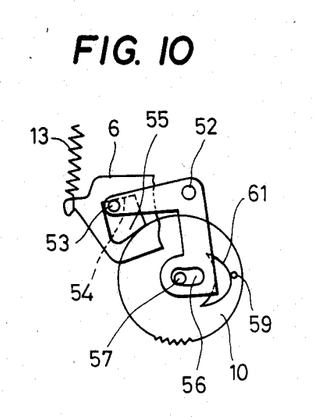

First, referring to FIGS. 8 to 10, there is provided above the pulley 10 of the tape-end detecting device, namely on the opposite side thereof from the cam 9 and island cam 12, an L-shaped unlocking link 51 pivotably supported on a support shaft 52. This unlocking link 51 has provided at the end of one arm thereof a pin 53 which is able to get into contact with a presser surface 54 provided on the oscillating plate 6. It should be noted that although the pressure surface 54 is the edge of an opening 55 formed in the oscillating plate 6, it may alternatively be a protruding member formed at a portion of the oscillating plate 6. The unlocking link 51 has formed in the end of the other arm thereof an elongated hole 56 curved like an arc around the support shaft 52. A support shaft 57 of the pulley 10 is freely movably inserted in the elongated hole 56.

Figure 11:
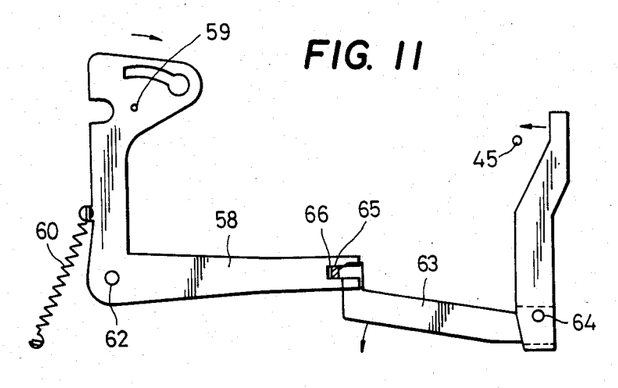
FIG. 11 is a plan view of an auxiliary link of the inventive embodiment.

One arm of a generally L-shaped first auxiliary link 58 shown in FIG. 11 is extended to the end of the arm of the unlocking link 51 on the pully side. The first auxiliary link 58 has provided at the end of the arm thereof a pin 59 projecting toward the surface of the pulley 10. The first auxiliary link 58 is urged counterclockwise under the action of a spring 60 provided between the arm and the chassis of the magnetic tape recording and reproducing apparatus. Thus, the pin 59 at the end of the auxiliary link is forced toward the center of the pulley 10 so as to be resiliently urged into contact with an edge at the end of the unlocking link 51.

There is provided on the top surface of the pulley 10, namely, on the surface facing the unlocking link 51, an island type unlocking cam 61 which is shaped like a crescent, of which the outer circumference is outwardly curved, while the inner circumference locates itself away from a support shaft 57 of the pulley 10 over a distance somewhat longer than that between one edge of the elongated hole 56 and the lateral edge with which the pin 59 is in contact. The outer circumference of the crescent is outwardly curved nearly to the outer circumference of the pulley 10. Therefore, the pin 59 of the first auxiliary link 58 is normally located within the island type unlocking link 61.

The first auxiliary link 58 is pivoted at the corner thereof to a support shaft 62, and is coupled at the other end thereof with one end of a similarly L-shaped second auxiliary link 63 which is pivoted at the corner thereof to a support shaft 64. Also, this second auxiliary link 63 is coupled with the first auxiliary link 58 by having a claw 65 provided at the end of one arm of the second auxiliary link received in a cut 66 in the first auxiliary link 58. The second auxiliary link 63 extends at the other end thereof to the region of the lever locking link 42 of the fast forward lever 40F and rewind lever 40R as shown in FIGS. 6 and 7, and so it is engageable with the lock pin 45 provided on the lever locking link 42 and can move the pin 45 in the direction of disengaging the lever lock pin 45 from the engagement protrusions 46F and 46R on the fast forward and rewind lever sides.

(2)

Functions

The inventive embodiment is constructed as described in the foregoing, and it functions as follows:

(a) Reproduction mode (also see FIGS. 3 and 4)

In the reproduction mode of operation, the head plate 21 is moved forward (leftward) to a position where the head 20 is pressed to the tape. Consequently, the sliding plate 23 operationally coupled with the head plate 21 is also moved forward, and the third arm 27C of the switching link 27 provided at the end of the head plate 21 takes a position in proximity of the motor stopping or ejection starting switch SW.

Since the oscillating plate 6 will not oscillate a long stroke, as shown in FIG. 3, while the tape is running, the switching link 27 will be in contact with the oscillating plate 6 of the tape-end detecting device, and the third arm 27c which is urged counterclockwise under the action of the spring 31 is away from the switch SW.

When an end of tape is reached during the reproduction mode of operation, the oscillating plate 6 pivots a large stroke under the action of the island cam 12 so that the second arm 27b of the switching link 27 is moved clockwise by the arm end of the oscillating plate 6. The third arm of this link 27 will pivot against the action of the spring 31, thus pressing the switch SW so that the switch acts to interrupt the power supply to the motor or to switch the driving force of the motor from that for tape run to that for ejection of the cassette pack.

(b) Fast forward and rewind modes (also see FIG. 5)

When the fast forward or rewind mode is set up, the head plate 21 is reversebly moved to a position where the head gets in a light contact with the tape. Accordingly, the sliding plate 23 is also reversely moved so that the switching link 27 on the sliding plate 23 is reversely moved to a position away from the switch SW. Thus, if the oscillating plate 6 pivots a large stroke when an end of tape is reached, the arm of the oscillating plate 6 is unable to get in contact with the switching link 27 thus reversely moved, so the switch SW will not be actuated at any tape end.

When an end of tape is reached, either of the fast forward and rewind modes is changed to the reproduction mode as in the sequence which will be described in (4) below, and the head plate 21 is moved forward to a state shown in FIG. 3.

If the apparatus was in the first forward mode at this time, the tape end reached as above is the trailing end of tape so that the tape will not start running even when the reproduction mode is restored. Thus, the switching link 27, having been moved forward along with the head plate 21, is pressed by the oscillating plate 6, which pivots through a large stroke because of the continuing tape-end detection, so as to actuate the switch SW, for thereby stopping the motor or ejecting the cassette pack.

If the apparatus was in the rewind mode, any tape end detected is the beginning end of tape, so when the reproduction mode is restored, the tape will start running from the initial point. In thus way, the oscillating plate 6, having detected when the tape is running, will not pivot through a large stroke to actuate the switch SW. In the rewind mode, the motor will not be stopped or the cassette pack ejected as in the case of a conventional magnetic tape recording and reproducing apparatus.

(c) Fast forward and rewind modes (alse refer to FIGS. 6 and 8)

In order to set the magnetic tape recording and reproducing apparatus in the fast forward or rewind mode of operation, the fast forward lever 40F (rewind lever 40R for rewinding the tape) is pushed into the apparatus against the force of the spring 41F so that the taper cam 49F at the end of the lever will press the shift pin 50, for thereby moving the head plate 21, which has thereon the shift pin 50, rearwardly (rightwardly) from the position for the reproduction mode to one for fast forward or rewind mode. At the same time, the engagement protrusion 46F of the fast forward lever 40F is made to engage the lock pin 45 of the lever locking link 42. Since the lever locking link 42 is urged counterclockwise by the spring 44, both the engagement protrusion 46F and lock pin 45 remain engaged with each other and the head plate 21 stays in the position for fast forward or rewind.

With the fast forward lever 40F pushed in, the taper cam 47F provided nearly in the center of the fast forward lever 40F presses the pin 48 of the idler gear changing link so that an idler gear (not shown) operationally connected with the idler gear changing link is shifted from the position for reproduction mode to that for fast forward mode. Thus, the tape will start runnig fast.

During the tape run, the oscillating plate 6 pivots through a small stroke, without pressing the unlocking link 51. Therefore, the unlocking link 51 pivots clockwise in response to the pin 59 of the first auxiliary link 58 being in contact with the edge of the link 51 as shown in FIG. 8, and also the pin 59 is in a position near the support shaft 57 of the pulley 10. For this reason, as the pulley 10 keeps rotating, the pin 59 will pass between the inner circumference of the unlocking cam 61 on the surface of the pulley 10 and the support shaft 57, without getting in contact with the cam 61.

(d) Releasing of fast forward and rewind mode (also see FIGS. 7, 9 to 10)

When an end of tape is reached in the fast forward or rewind mode, the oscillating plate 6 pivots through a large stroke. The presser surface 54 of the oscillating plate 6 will press the unlocking link 51 counterclockwise, with the result that the pin 59 of the first auxiliary link 58 is no longer in contact with the end of the unlocking link 51 and is pressed to the outer circumference of the pulley 10 as shown in FIG. 9. Then, the unlocking cam 61 of the pulley 10 during rotation goes inside the pin 59 thus pressed toward the outer circumference to further press the pin 59 toward the outer circumferential side of the pulley 10. As the result, the pin 59 will move through a large stroke until it is beyond the pivoting range of the unlocking link 51, and also the first auxiliary link 58 integral with the pin 59 will pivot clockwise against the action of the spring 60. Since the first auxiliary link 58 is operationally connected with the second auxiliary link 63, the latter will pivot counterclockwise, with the lock pin 45 being pressed by the end of the second auxiliary link 63.

The lock pin 45 is engaged with the engagement protrusion 46 of the fast forward lever 40F. It will be disengaged from the protrusion 46 due to the above-mentioned pressing operation of the second auxiliary link 63, and so the fast forward lever 40F having been retained by the lock pin 45 is released to move forwardly under the action of the spring 41F, whereby the taper cam 47F at the end of the lever 40F no longer presses the shift pin 50, and thus the fast forward mode is released.

It should be noted that a quite similar operation is also done for the rewind mode of operation to lock and/or unlock the rewind lever 40R.

The present invention is not limited only to the embodiment having been described and illustrated with reference to the drawings, but may be embodied in the following variations and modifications:

(1) The above-mentioned first and second auxiliary links are not used, but the lock pin 45 is pressed directly by the unlocking link 51 to release the fast forward lever 40F. Otherwise, a single or more than three auxiliary links can be used.

(2) Instead of providing the switching link 27 on the sliding plate 23, the head plate 21 has a portion which extends to the oscillating plate 6.

(3) The means of releasing the fast forward or rewind lever is not to amplify the magnitude of pivoting of the oscillating plate 6 and unlocking link 51 using the unlocking cam, but to provide a large stroke of direct pivoting of the oscillating plate 6. For example, the cam follower pin 11 provided in contact with the island cam 12 at the back of the pulley is used for causing the oscillating plate 6 to operate the auxiliary link. Otherwise, the fast forward or rewind lever pushed in the apparatus is retained by an electromagnetic plunger, and when an end of tape is reached, the electromagnetic plunger is deenergized by the large pivot stroke of the oscillating plate 6.

(4) In the mechanical tape-end detecting device, a stopper of any form provided on the rotation detecting disc in place of the Y-shaped guide slot is used to prevent, when the rotation detecting disc is slanted due to friction, the oscillating plate from pivoting a large stroke.

(5) In the mechanical tape-end detecting device, a change in tension of the tape is utilized to provide a large stroke of pivoting of the oscillating plate.

Figure 12:
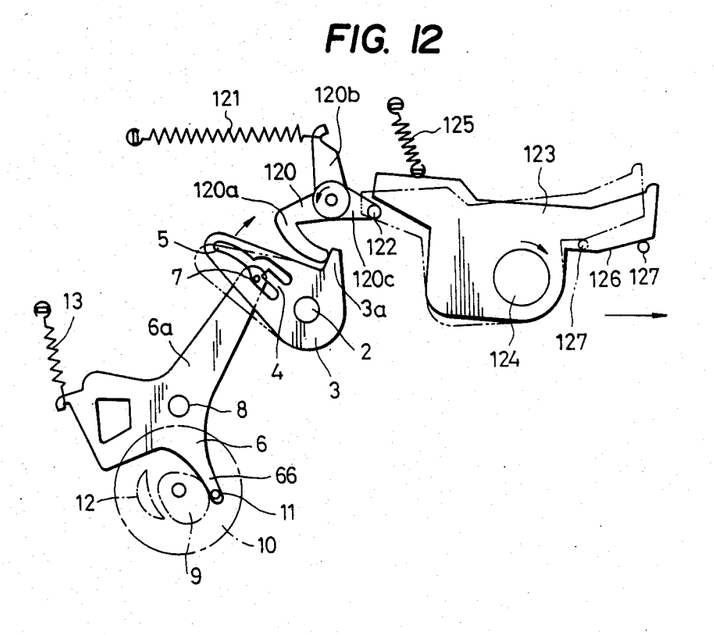
Figure 13:
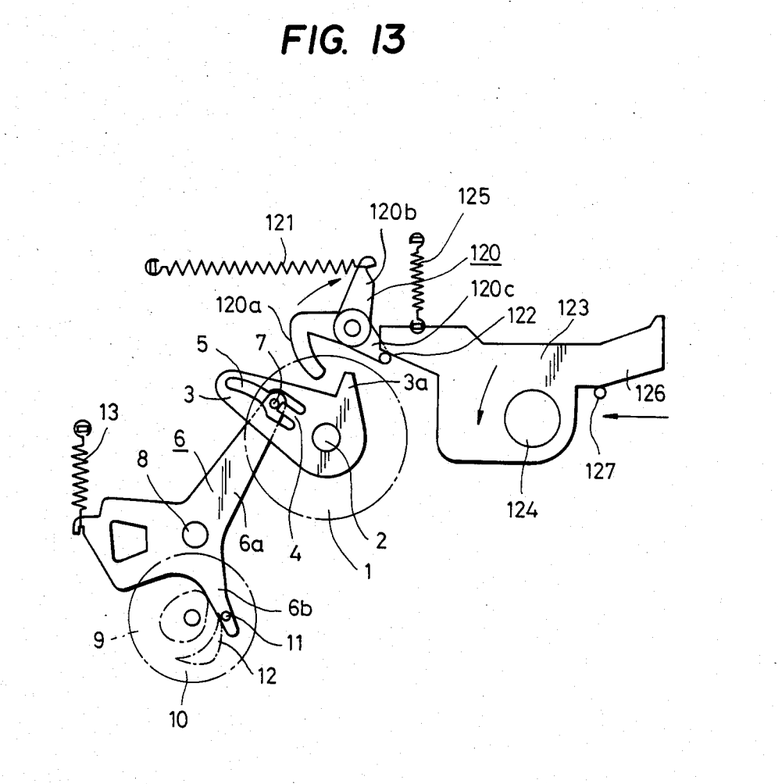

The erroneous detection preventive mechanism of the tape-end detecting device in the above-mentioned inventive embodiment will be described below:

Referring to FIGS. 12 and 13, a canceling link is indicated at the reference numeral 120 which is pivotably mounted at the center thereof on a support shaft. The canceling link 120 has arms 120a to 120c extending in three different directions; the first arm 120a is engageable at the end thereof with a protrusion 3a provided on the rotation detecting disc 3. There is provided between the second arm 120b and the chassis of the apparatus a spring 121 which biased the canceling link 120 in such a manner that the first arm 120a will press the rotation detecting disc 3 in the direction of the arrow as shown. The third arm 120c has provided at the end thereof an engagement pin 122 which a head-side link 123 can engage at one end thereof.

The head-side link 123 is pivotably supported at the center thereof on a support shaft 124. There is provided extending between the head-side link 123 and the chassis of the apparatus a spring 125 which biases the head-side link 123 so that the latter is urged away from the engagement pin 122 of the canceling link 120. The head-side link 123 has formed at the end thereof opposite from the canceling link 120 a taper portion 126 with which a head pin 127 movable to-and-fro as a result of being interlocked with the head is in slidable contact. The angulation of the taper portion 126 is so set that as the head pin 127 moves forward, the headside link 123 pivots counterclockwise.

The inventive mechanism of the construction described above is applicable for an automatic-loading type magnetic tape recording and reproducing apparatus arranged so that the apparatus is powered with insertion of a cassette pack into the pack insertion opening, thus starting the drive motor, from which the driving force is immediately transmitted to the take-up reel base for rotation. The supply reel base is provided with a brake device so that after the cassette pack is completely loaded into the apparatus, the head is pressed to the tape and the pinch roller to the capstan, with the brake device being released and also the supply reel base being thus rotatable. Further, the supply reel base of the apparatus is provided with a rotation detecting disc 3 and its associated canceling link 120, head-side link 123 and head pin 127, which form together the device as a whole. The inventive embodiment of the erroneous detection preventive mechanism is of a construction having been described in the above, and it functions as follows:

Before a cassette pack is inserted into the apparatus, the head is in the stop position rightwardly from the tape reproducing position, and also the head pin 127 is in the stop position as shown in FIG. 12. Thus, the head-side link 123 is urged clockwise by the spring 125 without being pressed counterclockwise by the head pin 127, and it is separated from the engagement pin 122 of the canceling link 120. The canceling link 120 is urged counterclockwise by the spring 121, and presses at the arm 120a thereof the rotation detecting disc 3 clockwise. Due to the friction with the rotating reel base, the rotation detecting disc 3 pivots to an angle with which one of the branches of the Y-shaped guide slot 5 positions itself on a path traveled by the pin 7 of the oscillating plate 6.

When a cassette pack is inserted into the pack insertion opening of the apparatus in this condition, the apparatus is powered, the motor is started, loading of the cassette pack is started and at the same time, the take-up reel base starts rotating. Note that the supply reel base is locked by the brake mechanism. When the pack is loaded and the reel-base shaft is inserted into the bore in the reel shaft, the take-up reel base is stopped with the tape pulled since the supply reel base is locked, unless the tape is slackened. The take-up reel base is provided with the rotation detecting disc 3. Normally it is detected as an end of tape when the take-up reel base is stopped before the head is pressed to the tape, but such erroneous detection does not occur here because the rotation detecting disc 3 is pivoted by link 120 to same angle as during the tape run, as shown in FIG. 12.

When the tape is slackened, the take-up reel base is stopped after having rotated for the tape slack. Also in this case, no tape-end detection occurs as in case of no tape slack being found. Accordingly, tape reproduction is started at a tape position existing when the cassette pack is inserted in the case no tape slack is found, or at a tape position existing when the tape is taken up for any slack.

After the cassette pack is completely loaded into the apparatus, the head is immediately pressed to the tape by means of the driving force of the motor or any other means. The head pin 127 moves forward to the left in the plane of the drawing as the head is pressed to the tape. The head pin is thus slid along the taper 126 so that the head-side link 123 pivots counterclockwise against the action of the spring 125, pressing at the end thereof the engagement pin 122 of the canceling link 120. Thus, the canceling link 120 pivots clockwise against the action of the spring 121, with the end of the arm 120a thereof leaving the protrusion 3a of the rotation detecting disc 3 which in turn will be freely pivotable. At the same time, the braking of the supply reel base is released due to the pressing of the head to the tape, so that the take-up reel base starts rotating. As the result, the rotation detecting disc 3 is freed or released from the canceling link 120 and is caused by the friction of the take-up reel base to pivot to the same angle as when pressed by the canceling link 120, for thereby detecting the rotation of the reel base. Thus, still no tape end is detected.

When an end of tape is reached so that the reel base 1 is stopped, the rotation detecting disc 3 is released from the frictionally pressed condition, and gets as shown in FIG. 2. Thus the pin 7 of the oscillating plate 6 abuts the protrusion 4 of the Y-shaped guide slot, detecting an end of tape.

According to the above-mentioned inventive embodiment, there occurs no inconvenience that any tape end is detected, even while the take-up reel base is stopped before the head is pressed to the tape. Therefore, during a period of time until the pressing of the head to the tape, the reel base will not be rotated, thus the tape will not run. It will not occur that the tape run is started at an incorrect position, resulting in missing of the start of a record or program on the tape when reproduced. Also the invention embodiment is advantageous in that any tape slack can be eliminated, since the supply reel base is previously locked while the take-up reel base is made to rotate.

The erroneous detection preventive mechanism according to the present invention is not limited to only the embodiment described in the foregoing, but it may be embodied as varied or modified in many different manners. The inventive mechanism may be adopted in, for example, a magnetic tape recording and reproducing apparatus in which, when it is not necessary to unslacken the tape, the take-up reel base is to be applied with no driving force by means of an idler or the like until the head is pressed to the tape. Also the rotation detecting disc 3 may be provided at the supply reel base. The shape and forcing direction of the canceling link may be appropriately varied; for example, the rotation detecting disc 3 could be pressed not by the spring 121 but by the head pin, and could be returned by the spring 121. The head pin canceling link 120 can be directly actuated without the necessity of providing the head-side link 123.

As having been described in the foregoing, with the magnetic tape recording and reproducing apparatus according to the present invention, when an end of tape is reached in the rewind mode of operation, the motor will not be stopped or a loaded cassette pack ejected, and an automatic changing of the operation mode to the reproduction mode at the beginning end of the tape will occur. Thus, the rewind operation is made very easy. Also, in the reproduction and fast forward mode in which it is necessary to stop the motor and eject the cassette pack, such operations can be done as in the conventional magnetic tape recording and reproducing apparatus. When the tape comes to a trailing end, no troublesome operation is needed.

With the above-mentioned erroneous detection preventive mechanism according to the present invention additionally incorporated in the magnetic tape apparatus, the tape-end detecting device will not improperly detect a tape end at the time of inserting a cassette pack into the apparatus. Thus, the present invention provides a magnetic tape recording and reproducing apparatus suffering from no such troubles as stopping and ejection of a cassette pack once inserted, or reproduction of a different program from an intended one for which a cassette pack is loaded into the apparatus.

The embodiments of the invention in which an exclusive property or privilege is claimed are defined as follows:

1. A magnetic tape reproducing apparatus, comprising:
    a pair of rotatably supported reel bases which can each operationally engage a respective reel of a cassette pack;
    a reproduction head and head shifting means supporting said reproduction head for movement toward and away from a reproduction position in which said reproduction head engages a tape within a cassette pack having reels operatively engaging said pair of reel bases, said head shifting means including means for resiliently urging said reproduction head toward said reproduction position;
    mechanical detecting means operationally coupled to one of said reel bases for detecting a stationary condition thereof;
    a mode selection switch which, when actuated, electrically selects a predetermined mode of operation of the apparatus;
    switching means supported for reciprocal movement and operationally coupled to said head shifting means, said head shifting means effecting synchronous movement of said switching means and said reproduction head, said switching means being responsive to detection of a stationary condition of said one reel base by said detecting means for actuating said switch when said reproduction head is in said reproduction position;
    selectively actuable fast-forward/rewind means for causing both of said reel bases to be rotated at high speed in a selected one of two opposite rotational directions, and means responsive to actuation of said fast-forward/rewind means for causing said head shifting means to move said reproduction head away from said reproduction position against the urging of said resilient means to a fast-forward/rewind position; and
    means responsive to said detecting means for deactuating said fast-forward/rewind means in response to detection by said detecting means of a stationary condition of said one reel base;
    wherein said detecting means includes: a detecting member coaxially rotationally supported on and frictionally engaging said one of said reel bases, said detecting member having therein a Y-shaped guide slot which has a stem portion and two branch portions; a rotating pulley having first and second cams thereon; and a movably supported oscillating member provided with a pin and a cam follower at respective ends thereof, said pin being slidably received in said Y-shaped guide slot, wherein when said one reel base is rotating said cam follower follows said first cam and moves said oscillating member so as to reciprocally move said pin between an intersection point of said branch portions and an end of one of said branch portions of said Y-shaped guide slot, and wherein when said reel base thereafter stops rotating said pin engages a protruding portion of said oscillating plate which is located between said branch portions and which holds said oscillating member in a position in which said cam follower is engaged by and then follows said second cam, said second cam moving said oscillating member so as to move said pin to an end of said stem portion of said Y-shaped guide slot remote from said protruding portion of said oscillating member;
    wherein said switching means includes: a movably supported sliding plate which is operationally coupled to said head shifting means, said head shifting means effecting synchronous movement of said sliding plate and said reproduction head, and a switching link pivotally supported on said sliding plate, said link having one end which is engageable with said oscillating member and having a further end which can engage and actuate said mode selection switch;
    wherein when said reproduction head is at said reproducing position said further end of said switching link on said sliding plate is positioned near said mode selection switch so that said oscillating member can readily engage said one end of said switching link and pivot said switching link and thereby cause said further end of said switching link to engage and actuate said mode selection switch when said detecting means effects movement of said oscillating member in response to detection of a stationary condition of said one of said reel bases; and wherein when said reproduction head is at said fast-forward/rewind position said sliding plate is positioned so as to place said switching link at a location spaced from said mode selection switch and said oscillating member so as to prevent engagement of and rotation of said switching link by said oscillating member when said detecting means effects movement of said oscillating member in response to detection of a stationary condition of said one of said reel bases.

2. A magnetic tape reproducing apparatus as set forth in claim 1, wherein said means for deactuating said fast-forward/rewind means is operationally cooperable with said oscillating member and responsive to movement of said oscillating member by said second cam to the position in which said pin thereon is at said end of said stem portion of said Y-shaped slot in said detecting member for effecting said deactuation of said fast-forward/rewind means.

3. A magnetic tape reproducing apparatus as set forth in claim 1, including a movably supported canceling link engageable with said detecting member and operationally cooperable with said head shifting means, wherein when said head shifting means has moved said reproduction head to a stop position spaced from said reproducing and fast-forward/rewind positions said canceling link is engaging said detecting member and is yieldably urging said detecting member to pivot in a predetermined direction of rotation, and wherein when said reproduction head is in said reproduction and fast-forward/rewind positions said canceling link is spaced from said detecting member.

4. The magnetic tape reproducing apparatus as set forth in claim 1, wherein when said reproduction head is in said reproduction position and engaging a tape in a cassette, said reel bases rotate to effect movement of the tape in the cassette and said reproduction head reproduces information magnetically recorded on the tape; and wherein said predetermined mode of operation selected by said mode selection switch is automatic ejection of the cassette from said tape reproducing apparatus.

* * * * *